United States Patent
Wang et al.

(10) Patent No.: US 11,864,494 B2
(45) Date of Patent: Jan. 9, 2024

(54) AI-OPTIMIZED HARVESTER CONFIGURED TO MAXIMIZE YIELD AND MINIMIZE IMPURITIES

(71) Applicant: Landing AI, Ugland House (KY)

(72) Inventors: Dongyan Wang, San Jose, CA (US); Andrew Yan-Tak Ng, Los Altos, CA (US); Yiwen Rong, San Mateo, CA (US); Greg Frederick Diamos, Menlo Park, CA (US); Bo Tan, Santa Clara, CA (US); Beom Sik Kim, Belmont, CA (US); Timothy Viatcheslavovich Rosenflanz, Menlo Park, CA (US); Kai Yang, Fremont, CA (US); Tian Wu, San Mateo, CA (US)

(73) Assignee: Landing AI, Ugland House (KY)

( * ) Notice: Subject to any disclaimer, the term of this patent is extended or adjusted under 35 U.S.C. 154(b) by 684 days.

(21) Appl. No.: 16/712,911

(22) Filed: Dec. 12, 2019

(65) Prior Publication Data
US 2021/0120736 A1   Apr. 29, 2021

Related U.S. Application Data

(60) Provisional application No. 62/927,512, filed on Oct. 29, 2019.

(51) Int. Cl.
*G06N 20/00*     (2019.01)
*A01B 79/00*     (2006.01)
(Continued)

(52) U.S. Cl.
CPC .......... *A01D 41/127* (2013.01); *A01B 79/005* (2013.01); *A01D 41/1274* (2013.01);
(Continued)

(58) Field of Classification Search
CPC .............. A01D 41/127; A01D 41/1274; A01D 41/1277; A01D 41/1275; A01D 41/1271;
(Continued)

(56) References Cited

U.S. PATENT DOCUMENTS

| 5,586,033 A * | 12/1996 | Hall ..................... A01D 41/127 706/904 |
| 2003/0014171 A1* | 1/2003 | Ma ....................... A01D 41/127 701/50 |

(Continued)

OTHER PUBLICATIONS

Bawatharani, R., M. H. M. A. Bandara, and D. I. E. Senevirathne. "Influence of cutting height and forward speed on header losses in rice harvesting." International Journal of Agriculture, Forestry and Plantation Dec. 4, 2016: 1-9. (Year: 2016).*

(Continued)

*Primary Examiner* — Vu Le
*Assistant Examiner* — Tracy Mangialaschi
(74) *Attorney, Agent, or Firm* — Fenwick & West LLP

(57) ABSTRACT

Systems and methods are disclosed herein for detecting impurities of harvested plants in a receptacle of a harvester. In an embodiment, a harvester controller receives, from a camera facing the contents of the receptacle, an image of the contents. The harvester controller applies the image as input to a machine learning model. The harvester controller receives, as output from the machine learning model, an identification of an impurity of the harvested plants. The harvester controller transmits a control signal based on the impurity.

17 Claims, 6 Drawing Sheets

(51) Int. Cl.

| | | |
|---|---|---|
| *G06T 7/00* | (2017.01) | |
| *G05B 13/02* | (2006.01) | |
| *G06N 5/04* | (2023.01) | |
| *G06V 20/10* | (2022.01) | |
| *A01D 41/127* | (2006.01) | |
| *H04N 23/90* | (2023.01) | |

(52) U.S. Cl.
CPC ........... *G05B 13/0265* (2013.01); *G06N 5/04* (2013.01); *G06N 20/00* (2019.01); *G06T 7/0002* (2013.01); *G06T 7/0004* (2013.01); *G06T 7/97* (2017.01); *G06V 20/188* (2022.01); *H04N 23/90* (2023.01); *G06T 2207/20081* (2013.01); *G06T 2207/30188* (2013.01)

(58) Field of Classification Search
CPC ........ H04N 5/232; H04N 5/247; H04N 23/90; H04N 23/60; G06T 7/0004; G06T 7/97; G06T 7/0002; G06T 2207/30188; G06T 2207/20081; G06N 5/04; G06N 5/003; G06N 20/00; A01B 79/005; G05B 13/0265; G06V 20/188; G06V 20/38; G05N 5/04; G05N 5/01
See application file for complete search history.

(56) References Cited

U.S. PATENT DOCUMENTS

| | | | |
|---|---|---|---|
| 2016/0078611 A1* | 3/2016 | Butts | A01D 57/12 382/110 |
| 2016/0253595 A1* | 9/2016 | Mathur | G01N 33/0098 706/12 |
| 2018/0025254 A1* | 1/2018 | Wellington | G06V 10/42 382/110 |
| 2018/0042176 A1 | 2/2018 | Obropta et al. | |
| 2018/0271015 A1 | 9/2018 | Redden et al. | |
| 2021/0007277 A1* | 1/2021 | Anderson | A01D 41/1278 |
| 2021/0015045 A1* | 1/2021 | Vandike | A01D 41/127 |

OTHER PUBLICATIONS

Bawatharani, R. et al., "Influence of Cutting Height and Forward Speed on Header Losses in Rice Harvesting," International Journal of Agriculture, Forestry and Plantation, Dec. 2016, nine pages, vol. 4, ISSN 2462-1757.
PCT International Search Report and Written Opinion, PCT Application No. PCT/US2020/055494, dated Feb. 10, 2021, 24 pages.
PCT Invitation to Pay Additional Fees and, Where Applicable, Protest Fee, PCT Application No. PCT/US2020/055494, dated Dec. 17, 2020, two pages.

* cited by examiner

AI-OPTIMIZED HARVESTER CONFIGURED TO MAXIMIZE YIELD AND MINIMIZE IMPURITIES

CROSS-REFERENCE TO RELATED APPLICATIONS

This application claims the benefit of U.S. Provisional Application No. 62/927,512, filed Oct. 29, 2019, the disclosure of which is hereby incorporated by reference herein in its entirety.

BACKGROUND

Technical Field

This disclosure relates generally to optimizing function of a plant harvester, for example in maximizing yield and minimizing impurities of harvested plants, such as grain.

Description of Related Art

Existing plant harvester machines are subject to rendering harvested plants unusable by introducing impurities, such as chaffing and breakage of the plants. For example, a cutter of the harvester may, by moving too quickly, damage plants that are being harvested. As another example, a thresher that is moving too quickly may be unable to de-stem usable portions of plants, thus introducing stems into the harvested portions and creating an impurity. Impurities are accepted as a part of the harvesting process, and are manually detected and removed after the harvesting process is complete. This results in an expensive added step post-harvest, as well as a loss of usable plants that could have been harvested without impurities, if the impurities were detectable at an earlier time.

Existing plant harvester machines also may not harvest all useful parts of the available plants. For example, useful parts of plants may fall out of the side or rear of the harvester due to a sub-optimal threshing process or loading process into a receptacle of the harvester, such as a hopper. Existing systems fail to adequately detect such loss of useful parts of plants, thus resulting in a harvest yield that is lower than a potential harvest yield where loss is minimized or eliminated.

DETAILED DESCRIPTION OF THE PREFERRED EMBODIMENTS

Figure 1:
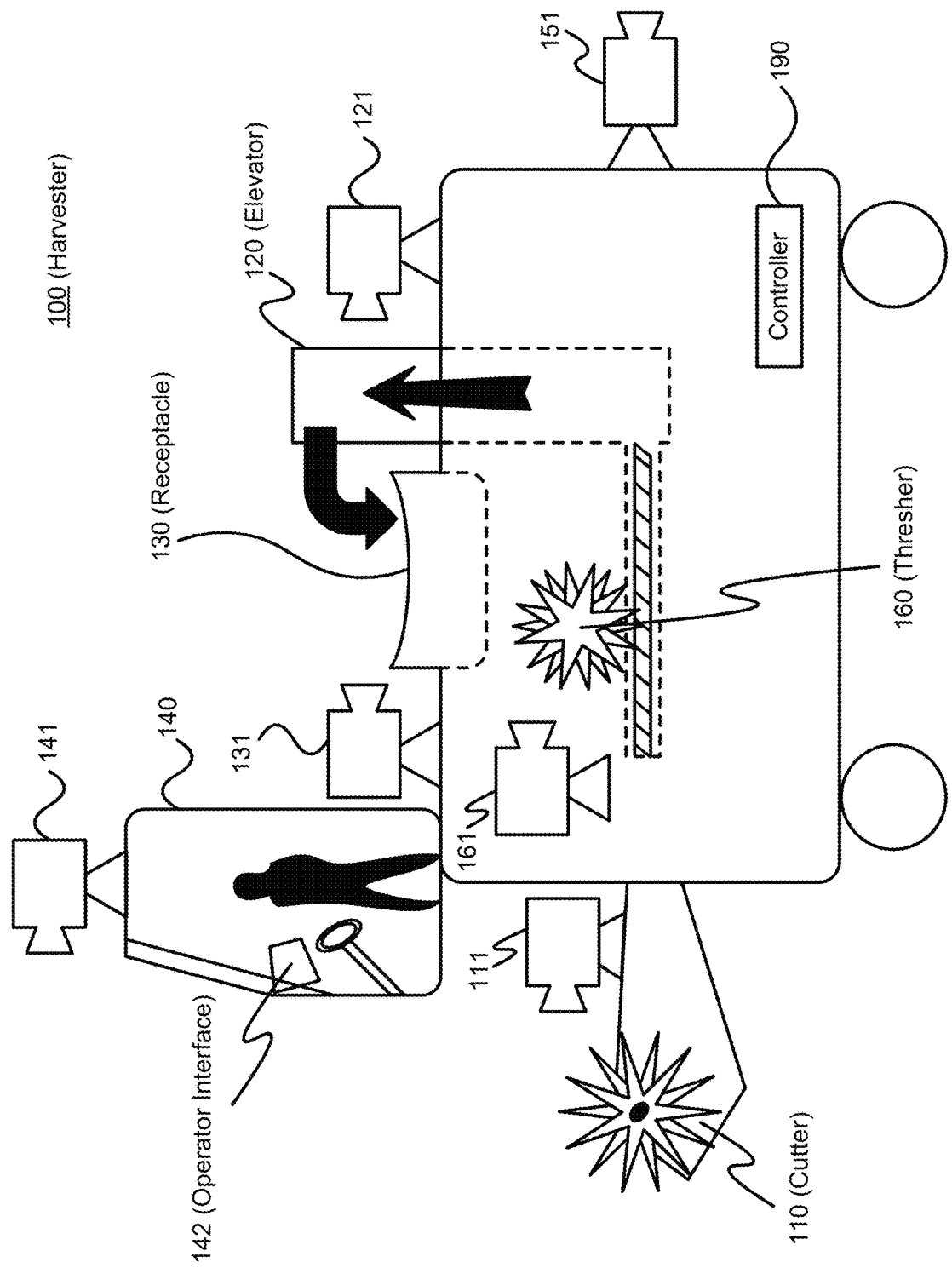
FIG. 1 shows an exemplary depiction of a harvester and cameras included thereon, in accordance with one embodiment.

The systems and methods described herein use machine learning techniques to reduce impurities and/or increase yield. With respect to reducing impurities, a harvester includes a controller and one or more component-facing cameras; that is, cameras that face a component along a processing path through the harvester. The harvester controller captures one or more images using the one or more component-facing cameras, and the controller receives those images and feeds those images as input to an impurity detection model, which may be a machine learning model. For example, the harvester controller receives an image captured by a camera facing a hopper of the harvester, and feeds the image of plants in the hopper as input to the impurity detection model. The harvester controller receives, as output from the impurity detection model, a determination of whether there is an impurity in the plants depicted in the image. The impurity may be chaffing of the plants, breakage of the plants, or any other impurity.

In an embodiment, the output of the impurity detection model may be a binary output of whether an impurity is detected. In an embodiment, the impurity detection model may output a non-binary value, such as a level of impurity. The level of impurity may be a discrete number with multiple possible values, or may be a continuous number. The harvester may feed the output of the impurity detection model to a controller model, along with other information about the harvester (e.g., the speed of the harvester, the height of a cutter of the harvester, etc.), and the controller model may output a state change for the harvester (e.g., slow vehicle speed; lower height of cutter). The controller model may be a machine learning model, or may be a model driven by heuristics. In an alternative embodiment, the output of the impurity detection model may be one or more specified types of impurities, and the harvester controller may feed the specified impurity type and the other information to the controller model to produce the state change for the harvester. Rather than using a machine learning model as a controller model, the harvester controller may use a heuristic, such as a decision tree, to determine a state change based on a specified impurity type and the other information.

With respect to increasing yield, the harvester controller may receive one or more images of plants that are about to be harvested from one or more external cameras. For example, the harvester controller may receive an image from a forward-facing camera at the front of the harvester. The harvester controller may feed the one or more images to a yield prediction model, which may be a machine learning model, and may receive, as output from the yield prediction model, a predicted harvest yield (e.g., a predicted amount of grain). The harvester controller may, as the plants depicted in the one or more images are harvested, capture one or more images from cameras inside of the harvester controller, such as images from the camera facing the receptacle of the harvester, or other cameras (e.g., cameras facing a grain elevator). The harvester controller may determine, by feeding the post-harvest images into a yield determination model, an amount of plants that were actually harvested. Where the actual harvest does not match the predicted harvest, the harvester controller may output a control signal that drives a state change of the harvester to improve yield.

FIG. 1 shows an exemplary depiction of a harvester and cameras included thereon, in accordance with one embodiment. Harvester 100 includes cutter 110, cutter camera 111, thresher 160, thresher camera 161, elevator 120, elevator camera 121, receptacle 130, and receptacle camera 131. Harvester 100 may also include operator compartment 140, front-facing camera 141, operator interface 142, rear-facing camera 151, and controller 190.

Cutter 110 is used to cut plants while harvester 100 is in operation. While harvester 100 travels through plants, cutter 110 cuts those plants from the stalks, branches, etc. on which they grow. Cutter 110 may have a variable height with respect to the ground, and thus may be raised or lowered (e.g., using operator interface 142, or using controller 190 for automatic adjustment, as is discussed below). Cutter 110 may have variable speed that may be raised or lowered (e.g., using operator interface 142, or using controller 190 for automatic adjustment, as is discussed below). Adjusting the height and/or speed of cutter 110 may be advantageous to improve the yield of what is harvested (e.g., where speed is destroying useful parts of the plants, or where the cutter is low enough that too much stalk is being cut)

Harvester 100 moves the cut plants (e.g., using a belt or other movement mechanism) to thresher 160. Thresher 160 mechanically separates useful parts of the plants (e.g., grain, fruit, etc.) from non-useful parts of the plants (e.g., stems). The speed at which thresher 160 operates may be adjusted (e.g., using operator interface 142, or using controller 190 for automatic adjustment, as is discussed below). For example, useful parts of the plants may be damaged if thresher 160 is operating too quickly, and thus it may be advantageous to reduce the speed at which thresher 160 operates. As another example, it may be possible to improve efficiency by increasing the speed of thresher 160 without damaging useful parts of the plants, and thus it may be advantageous to increase the speed at which thresher 160 operates.

Elevator 120 transports the useful parts of the plants from thresher 160 to receptacle 130. While elevator 120 is depicted as vertically raising plants for deposit into receptacle 130, elevator 120 may operate in any direction. Elevator 120 may include any mechanism for lifting or otherwise transporting plants between thresher 160 and receptacle 130, such as a platform that rises, falls, and tilts, a belt, and the like. The speed at which elevator 120 operates may be adjusted (e.g., based on input at operator interface 142, or automatic adjustments as commanded by controller 190, as discussed below). Adjusting a speed of elevator 120 may be advantageous where, e.g., elevator 120 is moving so quickly that useful parts of plants are falling off of elevator 120 and never making it to receptacle 130. Receptacle 130 may be any receptacle suitable for storing plant matter until the plant matter is removed from harvester 100.

Cameras 111, 121, 131, 141, 151, and 161 capture images and/or video that include plant matter being processed by various components of harvester 100. While only one of each type of camera is depicted, multiple cameras may be included at each location, each having different views. While not depicted, harvester 100 may include fewer, or more cameras, such as cameras at the sides and/or angles of the harvester. While also not depicted, harvester 100 may include one or more sampling devices. A sampling device may be used to periodically capture a sample of plant (e.g., grain) material. A divider or diverter may be used to take the captured sample and present that sample to a camera system in a controlled static environment. The utility of the sampler is to obtain a high-quality image where motion or dust may preclude such an image from being taken during operation of harvester 100. Sampling devices may divert samples to any of the cameras depicted in FIG. 1, or to a non-depicted camera (e.g., a camera dedicated to examining samples, or dedicated to examining samples at a certain stage of processing by harvester 100).

Controller 190, which is a harvester controller, outputs control signals to harvester 100. The control signals may cause any aforementioned and below-mentioned activity to occur (e.g., raise or lower thresher, change speed of harvester or of component of harvester, etc.). Particular outputs of controller 190 are discussed in further detail below with respect to FIGS. 2-4. Controller 190 may program the cameras of harvester 100 to capture images on a predefined basis (e.g., periodically, at predetermined times, during predetermined events, etc.), or may command the cameras to capture images upon receipt of the command.

Operator interface 142 may alert an operator of harvester 100 to various scenarios, such as the detection of an impurity or lower-than-predicted yield. Operator interface 142 may, alternatively or additionally, output recommendations to the operator (e.g., slow vehicle speed, lower cutter height, etc.). While an operator is depicted in harvester 100, harvester 100 may be autonomous and fully controlled by controller 190, or an operator may issue commands to harvester 100 remotely (e.g., from a site outside of harvester 100). While operator interface 142 is depicted as a panel of harvester 100, operator interface 142 may, in whole or in part, be installed on a peripheral device, such as by way of a mobile device application or in a permanent fixture in a control room.

Operator interface 142 may receive commands from an operator, such as commands for navigating harvester 100, commands for altering the function of a component of harvester 100 (e.g., adjust height of cutter 110), and the like. Any function of harvester 100 described herein may be commanded to occur by operator interface 142, controller 190, or some combination of the two.

Figure 2:
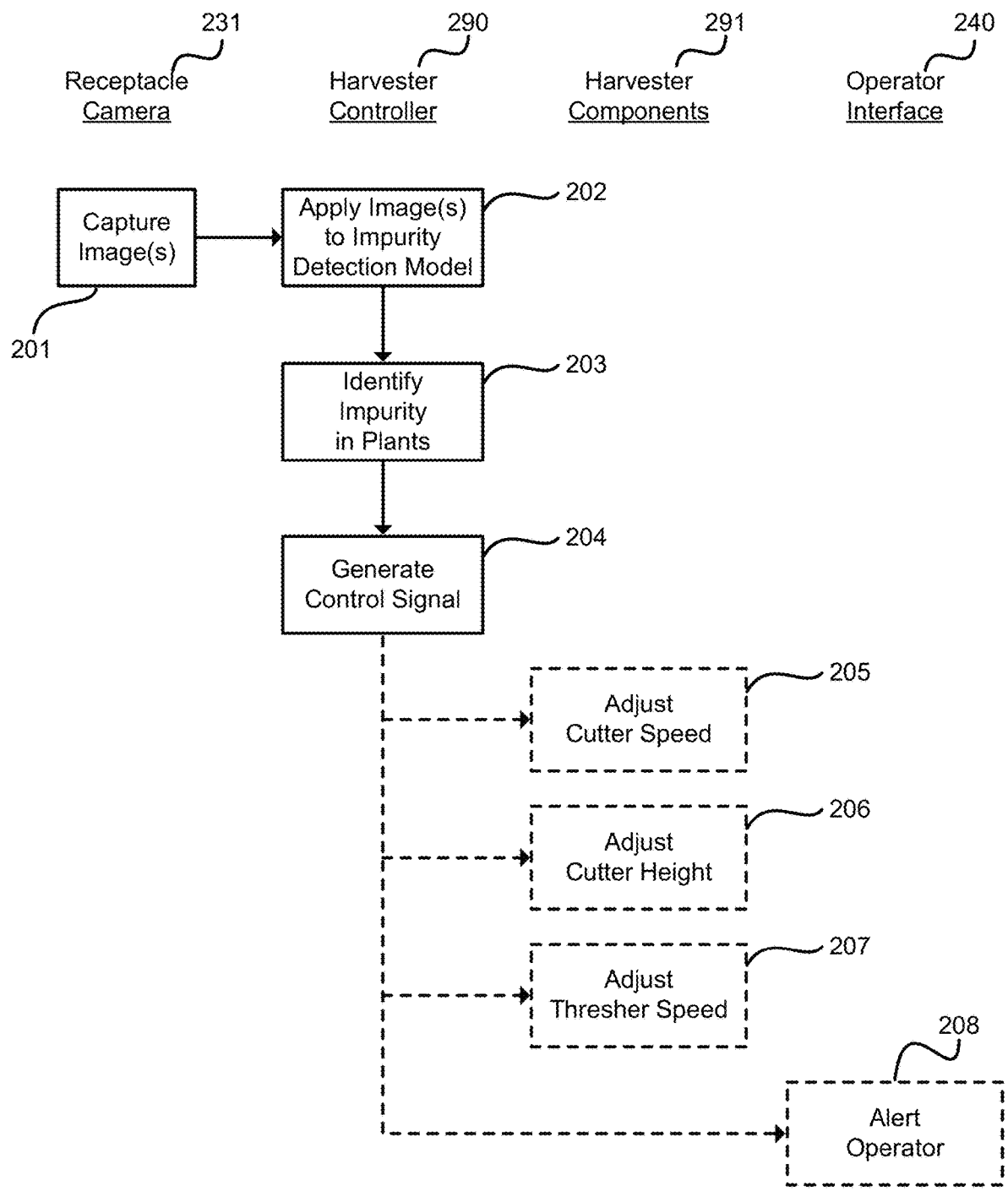
FIG. 2 is an exemplary flow diagram for generating a control signal to eliminate detected impurities in harvested plants, in accordance with one embodiment.

FIG. 2 is an exemplary flow diagram for generating a control signal to eliminate detected impurities in harvested plants, in accordance with one embodiment. The data flow begins with receptacle camera 231 capturing 201 one or more images of the receptacle (e.g., receptacle 130). Controller 290 receives the one or more images and applies 202 the one or more images to an impurity detection model. The impurity detection model is a machine learning model that either outputs a determination of impurity, or outputs data that may be used to identify an impurity. The impurity detection model may be a pixel segmentation model, a severity category classification model, or a bounding box model, for example. In pixel segmentation, the machine learning model takes in images and outputs probabilities of belonging to a specific class (e.g., an impurity, or not an impurity) for each pixel of the input image. In bounding box, the machine learning model takes in images and outputs bounding box locations with corresponding category class probabilities (e.g., bounding box locations where impurities likely exist). One image can have zero, one, or more boxes predicted. In classification, the impurity detection model takes in images and outputs probabilities belonging to a specific class category for the whole image.

Controller 290 receives output from the impurity detection model, and identifies 203 therefrom an impurity in plants depicted in the one or more images. In an embodiment, controller 290 identifies 203 the impurity based directly on output from the impurity detection model. That is, the impurity detection model outputs the impurity (e.g., chaffing or breakage in grain in receptacle 130), and that output is directly used to identify the impurity. Alternatively, where the output of the impurity detection model amounts to data, such as probabilities of various impurities having been found, controller 290 identifies 203 the impurity based on that data, either using a heuristic or an additional machine learning model. Exemplary heuristics may include determining whether a probability exceeds a threshold, and responsively determining that an impurity corresponding to that probability exists. Where multiple probabilities exceed a threshold, controller 290 may determine that multiple impurities exist, or may determine that the impurity with the highest probability exists. Where no probability exceeds a threshold, controller 290 may determine that no impurity exists. The threshold may be set by an administrator, by an operator of harvester 100, or by default. There may be different thresholds in place for different types of impurities. Where another machine learning model is used, the probabilities output by the impurity detection model may be input to another machine learning model (e.g., optionally with other signals, such as harvester parameters (e.g., harvester heading and speed; harvester component parameters such as cutter speed, etc.)), and the additional machine learning model may output one or more impurities, which controller 290 uses to identify 203 impurities in the plants.

In an embodiment, rather than identify a particular impurity, controller 290 simply identifies 203 that an impurity exists from the output of the impurity detection model, but does not identify that impurity with particularity. Where the impurity detection model outputs a probability that an impurity exists (without particularity), controller 290 may identify 203 whether an impurity exists using heuristics and/or a machine learning model. Exemplary heuristics are similar to those mentioned above with respect to particular impurities, except rather than compare a particular impurity's probability to a threshold, a probability of a generic impurity is compared to a threshold. Exemplary machine learning models are also similar to those mentioned above with respect to particular impurities, except rather than input particular impurity probabilities to the model, controller 290 inputs a probability of a generic impurity to the model (optionally along with other information).

Where an impurity is identified, controller 290 generates 204 a control signal based on the identified impurity. In an embodiment, the control signal is determined using a controller model. A controller model is a machine learning model that takes, as input, the identified impurity (or existence thereof). The controller model may optionally take in as input information from components of the harvester in addition to the identified impurity. The information from the components may include any data gathered by controller 290 from any component of harvester 100, such as a current speed of cutter 110, a current height of cutter 110, a current speed of thresher 160, image data from any camera of harvester 100, audio data from a microphone installed on harvester 100, and the like. For example, a whirring noise, along with a 60% probability of impurity, may equate to a problem with the thresher that is causing the thresher to whirr.

As depicted, the control signal may cause an adjustment 205 to the speed of cutter 110, such as increasing or decreasing the speed of cutter 110. For example, where breakage is detected, controller 290 may command cutter 110 to slow down in order to reduce breakage caused by cutter 110 spinning too quickly.

Additionally or alternatively, controller 290 may command the harvester to adjust 206 the height of cutter 110. For example, the cutter may be too low, thus causing a large amount of unusable plant (e.g., a wheat stalk) to be cut, resulting in unnecessary work by the thresher to remove an excess of unusable plant. A command to raise the height of cutter 110 would result in improved performance and may be commanded by a control signal in such an instance.

Alternatively or additionally, controller 290 may command the harvester to adjust 207 the speed of thresher 160. For example, thresher 160 may be moving too quickly, which causes unusable portions of the plant to proceed to elevator 120. A command to reduce the speed of thresher 160 would result in improved performance in that less unusable portions of the plant would proceed to elevator 120, and thus may be commanded by a controller in such an instance.

Additionally or alternatively, controller 290 may command harvester 100 to alert 208 the operator using operator interface 142. The alert may inform the harvester of the impurity (e.g., "you are cutting too much stalk"), and/or may inform the harvester of remedial activity (e.g., "raise the height of the cutter to 1.2 meters"). Different alerts may be mapped in a database to different potential outputs by the controller model, and thus may be selected using the output of the controller model. The alerts may indicate recommended activity, or may indicate activity that is automatically occurring (e.g., "the height of the cutter is being automatically raised to 1.2 meters to reduce the amount of stalk being cut"). The alerts may include selectable options, that when selected by the operator, cause controller 190 to execute a function. The selectable options may include, for example, options for accepting or rejecting a proposed or enacted course of action.

Control signals depicted and described in relation to elements 205-208 in FIG. 2 are exemplary; any other functions of harvester 100 may be commanded by the control signals. For example, while not depicted, harvester controller 290 may command any state change be performed with respect to harvester 100, such as the adjusting parameters like vehicle speed, or like the speed or tilt of elevator 120.

Figure 3:
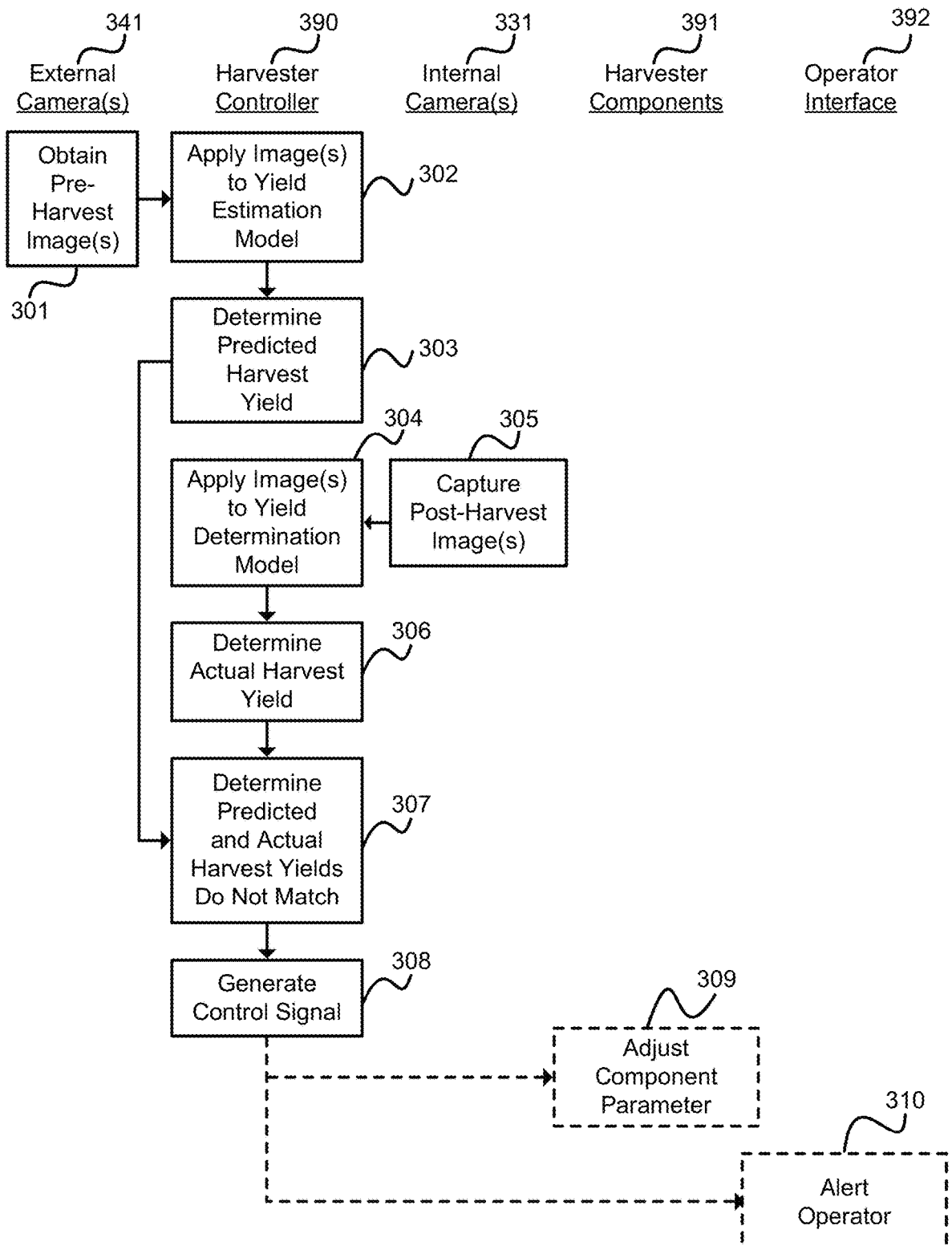
FIG. 3 is an exemplary flow diagram to improve yield of a harvest where lower-than-predicted yield is encountered during a portion of a harvest, in accordance with one embodiment.

FIG. 3 is an exemplary flow diagram to improve yield of a harvest where lower-than-predicted yield is encountered during a portion of a harvest, in accordance with one embodiment. The data flow begins with one or more external cameras 341 obtaining 301 pre-harvest images. The term external camera, as used herein, refers to any camera installed on harvester 100 that is programmed to collect imagery of the surroundings of the harvester (e.g., a field of crops). Front-facing camera 141 is an example of an external camera. Other external cameras may include rear-facing camera 150, and any other camera facing away from harvester 100 (e.g., on the sides, top, or bottom of harvester 100 or a component thereof). This is distinguished from interior cameras, which are cameras configured to face a component of harvester 100 and capture images of that component (e.g., thresher camera 161, receptacle camera 131, elevator camera 121, cutter camera 111, etc.).

Controller 390 receives the images from external cameras 341, or from a database that collects and stores images from external cameras 341, and applies 302 the images as input into a yield estimation model. The yield estimation model may be a machine learning model configured to take, as input, images from external cameras (e.g., images of plants to be harvested), and output a predicted yield, or information sufficient for harvester controller 390 to compute a predicted yield. The predicted yield may be a prediction of an amount of useful plant matter that harvester 100 will obtain. The prediction may be an aggregate prediction (e.g., an amount of useful plant matter to be harvested across the entire field), a rate prediction (e.g., a rate at which useful plant matter will be harvested over time), or any other prediction. Yield estimation model may be configured to, in addition to the images, accept other signals as input, such as type of plant to be harvested, type of components installed in harvester 100, temperature, operator information, and any other information.

Controller 390 determines 303 the predicted yield based on output of the yield estimation model. The determination may be with respect to a period of time. For example, controller 390 may determine that the harvester has been operating for 30 seconds, and may receive a predicted yield of a certain amount of produce per second. Thus, controller 390 may determine a gross amount of yield that would be predicted to be harvested in 30 seconds using the rate of the predicted yield.

Separately, one or more interior cameras 331 (e.g., receptacle camera 131, elevator camera 121, thresher camera 161, etc.) capture 305 post-harvest images that correspond to the plants depicted in the pre-harvest images. For example, with knowledge of the speed of harvester 100 and parameters of the components of harvester 100, controller 390 determines when the plants depicted in the pre-harvest images will arrive in, e.g., receptacle 130, and commands receptacle camera 131 to capture an image at that time. The interior camera(s) 331 may capture images when commanded by harvester controller 390, or may capture images periodically or non-periodically depending on capture settings. Interior camera(s) 331 may capture images responsive to a sensor (e.g., a motion sensor or weight sensor) detects a predetermined amount of a parameter (e.g., a predetermined amount of motion or weight).

Controller 390 applies 304 the post-harvest images as input to a yield determination model, and determines 306 an actual harvest yield therefrom. Where actual yield is determined while harvester 100 is being operated, images from a plurality of different times (e.g., one image per half-second) may be applied as input, along with other information, such as time-stamps of when each image was taken. Controller 390 may apply other signals as input to the yield determination model, such as weight (or weights at each timestamp corresponding to the images) of a component (e.g., receptacle 130) or any other parameter of harvester 100. Alternatively, whether during operation of harvester 100 or at the conclusion of a harvesting session, controller 390 may apply a single image (e.g., of receptacle 130) as input to the yield determination model (optionally with other signals). Controller 390 receives an output of a determined yield. The determined yield is referred to below as the "actual harvest yield." Actual harvest yield refers to the determination by the yield determination model, and need not exactly match a determination by hand of an exact amount that was actually harvested. With sufficient training data, the yield determination model may output a true harvest amount. For example, the difference between the actual harvest yield and the determined yield is an approximation error, which can be reduced with better modeling or more training data that improves over time. Bayes Error or IrreducableError may be used to describe a fundamental lower bound on approximation error.

Controller 390 determines 307, by comparing the predicted harvest yield and the actual harvest yield, that the predicted harvest yield and actual harvest yield do not match. To perform this determination, harvester 390 may determine whether the predicted harvest yield has a value that exactly matches the value of the actual harvest yield, where a non-exact match yields determination 307. Alternatively, harvester 390 may determine whether the predicted harvest yield is within a predetermined number of units (e.g., weight or volume units) or is within a threshold percentage of the actual harvest yield, where going outside of those numbers yields determination 307.

Harvest controller 390 generates a control signal 309, which may command an adjustment 309 to component parameters of harvest 100. A commanded adjustment may be any adjustment described with respect to FIG. 2, such as adjustments 205-207. Additionally, or alternatively to commanding an adjustment 309, harvester controller 390 may command operator interface 142 to alert 310 the operator. The alert may be any alert described with respect to FIG. 2, such as alert 208.

Figure 4:
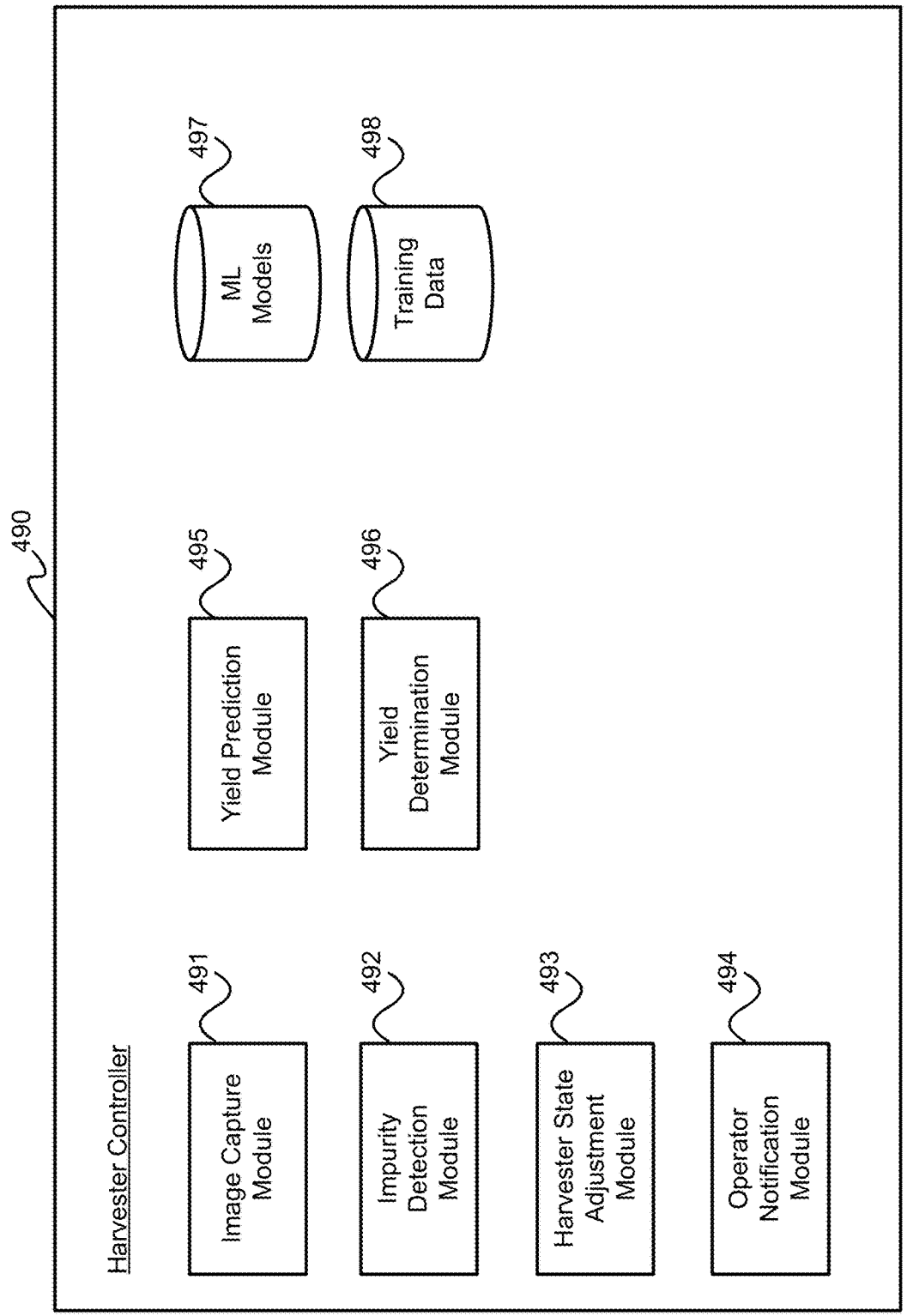
FIG. 4 depicts an exemplary harvester controller and modules thereof, in accordance with one embodiment.

FIG. 4 depicts an exemplary harvester controller and modules thereof, in accordance with one embodiment. Harvester controller 490 includes the same functionality described above and below with respect to the harvester controllers depicted in FIGS. 1-3. Harvester controller 490 includes image capture module 491, impurity detection module 492, harvester state adjustment module 493, operator notification module 494, yield prediction module 495, and yield determination module 496. Harvester controller 490 also includes machine learning (ML) models database 497 and training data database 498. The modules and databases depicted in FIG. 4 are merely exemplary; fewer or additional modules and databases may be included to achieve the functionality of harvester 100 described herein.

Image capture module 491 commands cameras of harvester 100 to capture images. The commands may be provided ahead of time (e.g., "capture an image once per second during operation"), or on an ad hoc basis (e.g., "capture an image now."). Harvester controller 490 may execute image capture module 491 to capture images for any purpose described herein. Impurity detection module 492 identifies impurities in plants. To this end, impurity detection module 492, when executed by harvester controller 290, applies inputs to an impurity detection module and identifies the impurities based on the outputs, as described with respect to FIG. 2 above.

Harvester state adjustment module 493 adjusts the state of parameters of harvester 100. Harvester state adjustment module 493, when executed by harvester controller 490, generates and outputs control signals (e.g., as described with reference to FIGS. 2-3) to alter the state of components of harvester 100 (e.g., raise or lower thresher; lower driving speed; change driving heading; etc.). Operator notification module 494, when executed by harvester controller 490, generates and outputs alerts to an operator via operator interface 142, as is described with reference to FIGS. 2-3.

Yield prediction module 495, when executed by harvester controller 490, applies one or more images (and optionally additional signals) to the yield estimation model, as is described with reference to FIG. 3 above. Similarly, yield determination module 496, when executed by harvester controller 490, applies one or more images (and optionally additional signals) to the yield determination model, as is described with reference to FIG. 3 above. ML models database 497 stores the various machine learning models disclosed herein. Training data database 498 stores training data for training the models described herein. The databases of FIG. 4 may be stored within harvester 100, or may be stored remote from harvester 100 and accessed by way of a network for storage and retrieval of additional data.

Figure 5A:
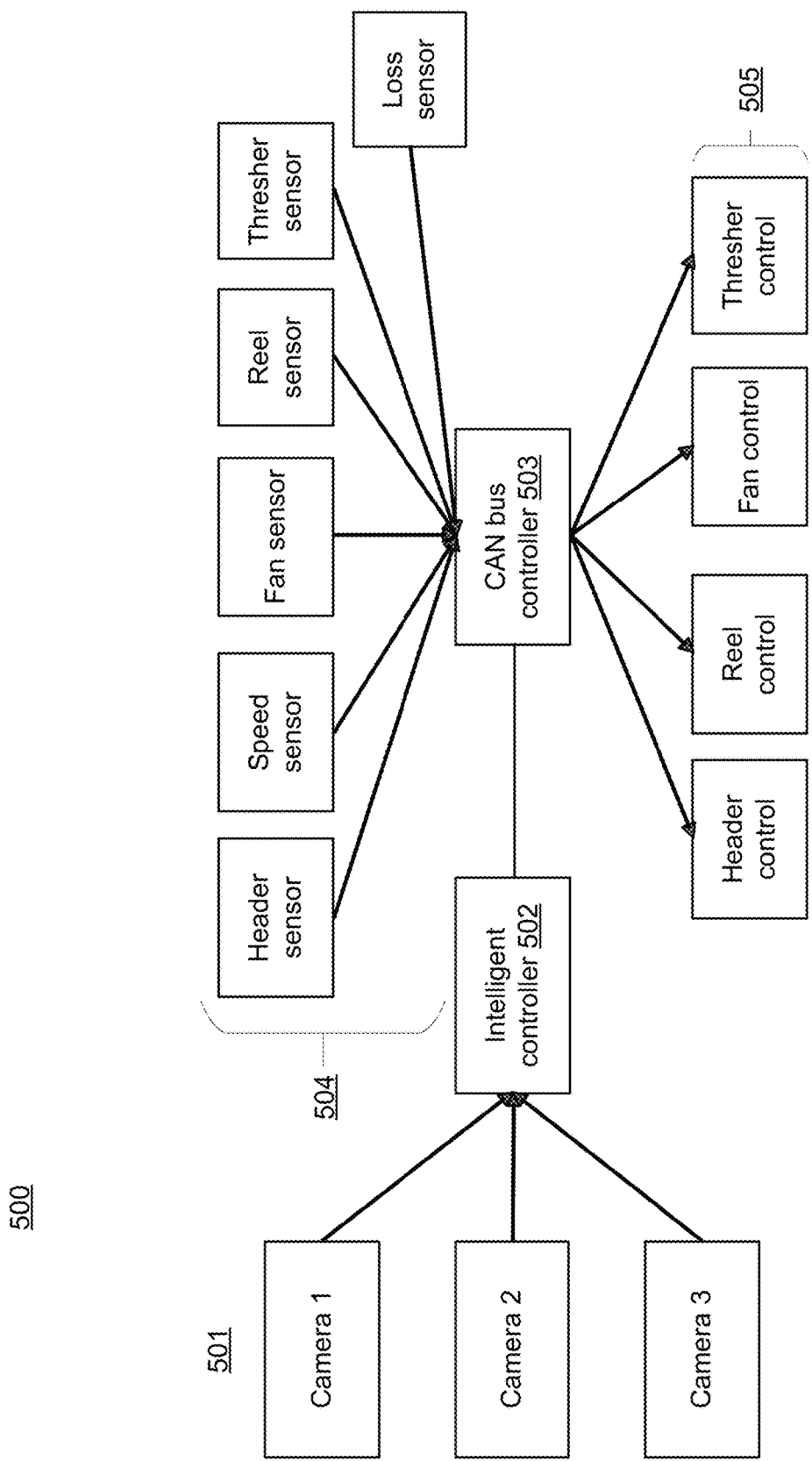
FIG. 5A is an exemplary block diagram of a harvester hardware system.
Figure 5B:
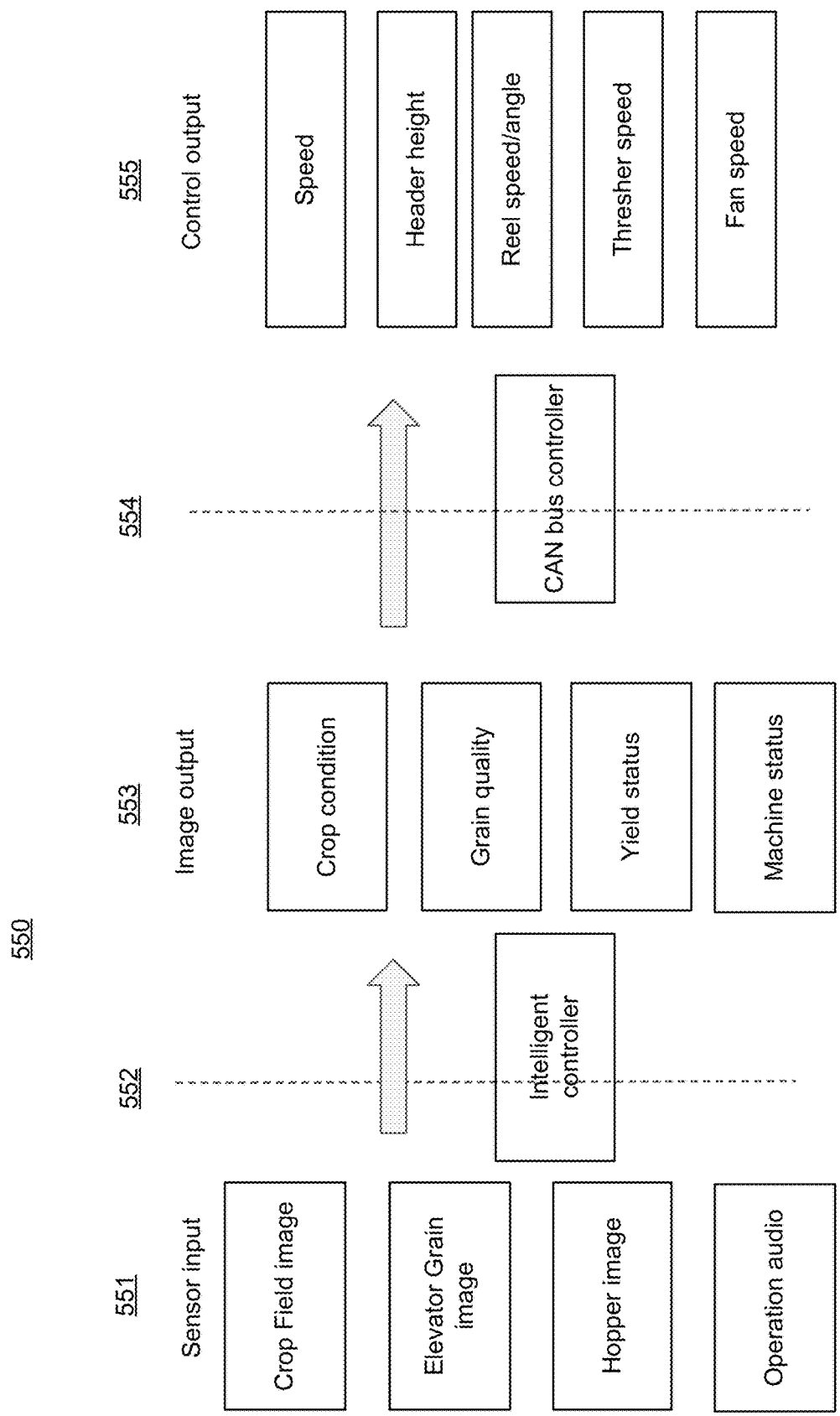
FIG. 5B is an exemplary block diagram of a harvester software system.

FIGS. 5A and 5B are exemplary block diagram of a harvester hardware and software systems, respectively. Referring first to environment 500 of FIG. 5A, images from cameras 501 are received by intelligent controller 502. Intelligent controller 502 may have some or all of any of the functionality described herein with respect to the various harvester controllers depicted in FIGS. 1-4. Intelligent controller 502 may also receive other signals, also described above with respect to FIGS. 1-4, from controller area network (CAN) bus controller 503. These signals may be received by CAN bus controller 503 from sensors 504. Sensors 504 include any sensor of harvester 100. Exemplary sensors 504 include those depicted of a header sensor, a speed sensor, a fan sensor, a reel sensor, a thresher, sensor, and a loss sensor, though any other sensor used on a harvester is within the scope of the disclosure. Intelligent controller 502 transmits control signals, such as those described above with respect to FIGS. 2-4, to CAN bus controller 503, which routes the control signals to various components to effect the commanded control. Exemplary controls 505 include header control (e.g., to control heading of harvester 100), reel control (e.g., to control reel components of harvester 100), fan control (e.g., to control a fan speed for cooling of harvester components), thresher control (e.g., to control thresher speed), and may include any other control corresponding to a control signal of a harvester 100.

Turning now to FIG. 5B, flow diagram 550 shows one embodiment of various exemplary inputs that are processed and lead to various exemplary control outputs. Sensor input 551 includes various image inputs, such as a crop field image (e.g., from front-facing camera 141), an elevator grain image (e.g., from elevator camera 121), a hopper image (e.g., from receptacle camera 131), and operation audio (e.g., including unusual whirring). Sensor input 550 may include more or fewer image inputs, and may include images from any number of internal and/or external cameras, and any other additional signals (e.g., audio, sensor inputs such as temperature of the thresher motor, heading and speed of harvester 100, etc.), as described above with respect to FIGS. 1-4.

An intelligent controller (e.g., intelligent controller 502) receives 552 the sensor input and produces an image output 553 (e.g., using one or more of the aforementioned machine learning models). Image output 553 may include a crop condition and/or grain quality (e.g., an impurity analysis), yield status (e.g., as determined from the data flow of FIG. 3), machine status (e.g., the health or efficiency of a given component of harvester 100), and any other output described with respect to the data flows of FIGS. 2 and 3. The intelligent controller outputs therefrom a control signal to a controller, such as CAN bus controller 503, which receives the control signal and outputs 554 control outputs 555 to adjust a state of harvester 100. Exemplary control outputs 555 may include any output described herein; as depicted, they include speed of harvester 100, height of the header of harvester 100, the header containing cutter 110), reel speed and angle of any reeling component of harvester 100, speed of thresher 160, and speed of any fan used within harvester 100.

Embodiments of harvester may include the following features:
- Chaff/Impurity detection
- Breakage detection
- Crop height detection
- Lodging detection
- Loss detection
- Yield mapping
- User feedback system
- Learning control system
- Crop type detector
- Obstacle/person/animal detector
- Crop density detector
- Terrain detector
- Weather/moisture detector
- Path suggestion for driver
- Drive straight line assist
- Audio sensors
- Machine operating condition For example, with respect to chaff detection, grain should be harvested without impurities such as chaff to increase grain quality (effects grain price) and decrease amount of hopper cleaning needed (faster harvesting). A system of component-facing cameras observes grain as it is processed, for example, hopper camera, elevator camera, front camera. A machine learning algorithm identifies impurities such as chaff. Example algorithms can be a pixel segmentation, or severity category classification. Once excessive chaff is detected, user is notified and/or automatic adjustments (cutter speed decrease, cutter height increase/decrease, threshing speed increase/decrease) to harvester settings are made.

Using breakage detection as another example, harvested grain should be whole, not crushed or broken according to quality standards that determine price of the grain. A system of component-facing cameras observes grain as it is processed, for example, hopper camera, elevator camera. A machine learning algorithm identifies broken or crushed grain. Example algorithms can be a pixel segmentation, bounding box, or severity category classification. Once broken grain is detected, user is notified and/or automatic adjustments (such as threshing speed decrease, slower driving) to harvester settings are made.

For yield optimization, front facing cameras observe the plants about to be harvested. A machine learning algorithm A predicts the amount of grain that will be harvested. Component-facing cameras monitor the interior of the harvester (e.g. elevator, combine, hopper, rear, etc.). A machine learning algorithm B observes the amount of grain actually harvested. The predictions of A and B are compared, if they are significantly different, the user is notified or the harvester controls are adjusted.

Parameters of the components of harvester 100 may be recorded, e.g., from a controller area network ("CAN") bus. Such parameters may include reel speed rounds per minute (RPM), roller speed RPM, fan speed RPM, elevator speed RPM, vehicle speed (in any metric, such as kilometers per hour), vehicle steer angle degree (e.g., the trajectory of harvester 100 relative to forward movement of harvester 100), the height of the cutter (or the header in which cutter 110 sits), reel speed, a loss ratio, coordinates (e.g., global positioning system (GPS) latitude and/or longitude), and any other parameter.

While FIGS. 2 and 3 are depicted as stand-alone data flows, they may be combined in whole or in part in any reasonable manner, and their elements may be performed in parallel or in any order or sequence. A few examples follow. Harvester controller 100 may detect breakage of plants using the machine learning model described above with respect to FIG. 2. Harvester controller 190 may responsively activate front-facing camera 141 and determine based on images therefrom whether the harvester is presently harvesting. If controller 190 determines that the harvester is harvesting, controller 190 may reduce the speed of harvester 100 in order to reduce breakage.

As another example, controller 190 may determine that loss of grain is occurring due to chaffing based on input of images from receptacle camera 130 being input into the machine learning model described with respect to FIG. 2. Controller 190 may determine that the chaffing is detected in a threshold amount, and may responsively command cutter 110 to lower its height in order to cause stems to be cut below the usable portion of the plant. As yet another example, controller 190 may calculate a rate at which yield is increasing or decreasing from frame-to-frame difference of images captured by receptacle camera 131. Responsive to detecting a decrease in yield rate, the processor may decrease the speed of thresher 160 in order to reduce loss caused by a high speed of thresher 160. Responsive to detecting an increase in yield rate, controller 190 may increase the speed of thresher 160, given that loss is no longer occurring. This process may iterate continuously or until the thresher converges on a speed that causes a constant yield rate.

Similar heuristics may be implemented by controller 190 to adjust any of the parameters of harvester 100. These heuristics may be programmed as default heuristics to controller 190, and/or may be customized by an operator of harvester 100. Some more examples include controller 190 determining, based on images of front-facing camera 141, whether lodging is detected, and increasing or decreasing the speed of the vehicle, and/or raising or lowering the height of cutter 110.

Outputs of the machine learning models may feed into training data for the respective machine learning model that made the output, or to any other machine learning model described herein, thus causing the machine learning models to learn from their respective outputs. Where recommendations are provided to an operator through operator interface 142, the reaction of the operator may feed back to the machine learning model that generated the recommendation. Alternatively or additionally, controller 190 may log the activity of an operator (e.g., based on whether the operator did or did not follow a recommendation), and may log the productivity of harvester 100 (e.g., whether yield increased or decreased, or whether impurities increased or decreased) responsive to that activity. Controller 190 may grade the operator based on the logged activity and productivity. Controller 190 may transmit the grades to a supervisor of the operator.

The machine learning models may be trained using manually labeled images. Generative modeling may be used, where labeled images are fed into a simulator (e.g., a grain simulator that plants synthetic images of grain in different conditions) to plants more images for labeling where training images are few in number.

Inputs to the machine learning models are not confined to data collected by components of harvester 100. For example, controller 190 may receive satellite images corresponding to the plants to be harvested, and may feed the satellite images, or data extracted therefrom, to the machine learning models described herein. Controller 190 may receive from, e.g., a cloud server, information, such as mapping data that indicates information about an area, like whether grand is less fertile in a given area, and may feed that data to heuristics and/or the machine learning models to obtain an output. Controller 190 may stitch together images from different cameras to plants a single image to input to a machine learning model.

What is claimed is:

1. A computer-implemented method for detecting impurities of harvested plants in a receptacle of a harvester, the method comprising:
   receiving, from a camera facing contents of the receptacle, an image of the contents;
   applying the image as input to a first machine learning model;
   receiving, as output from the first machine learning model, identification of an impurity of the harvested plants;
   determining a current state of one or more physical components of the harvester;
   applying, as input to a second machine learning model, both the current state of the one or more physical components of the harvester and the output from the first machine learning model of the identification of the impurity;
   generating a control signal based on output of the second machine learning model;
   transmitting the control signal to an operator interface that, responsive to receiving the control signal, provides an operator of the harvester with a recommended state change for the harvester;
   determining a response of the operator to the recommended state change; and
   causing the first machine learning model to adjust its outputs based on the response.

2. The computer-implemented method of claim 1, wherein the contents of the receptacle comprise grain.

3. The method of claim 1, wherein the impurity comprises at least one of chaffing or breaking of the harvested plants.

4. The method of claim 1, wherein the first machine learning model is at least one of a severity classification model, a bounding box model, and a pixel segmentation model.

5. The method of claim 1, wherein the control signal feeds back to the first machine learning model as training data.

6. The method of claim 1, wherein the recommended state change specifies a component of the harvester and a recommended action to take with respect to the specified component.

7. The method of claim 1, wherein the control signal causes speed of a cutter of the harvester to adjust.

8. The method of claim 7, wherein the control signal causes the speed of the cutter to decrease responsive to detecting chaffing or breakage of the harvested plants.

9. The method of claim 8, wherein the control signal causes the speed of the cutter to increase responsive to no longer detecting the chaffing or breakage of the harvested plants.

10. The method of claim 1, wherein the control signal causes a height of a cutter of the harvester to adjust.

11. The method of claim 10, wherein the control signal causes the height of the cutter to lower responsive to detecting chaff of the harvested plants.

12. The method of claim 10, wherein the control signal causes the height of the cutter to raise responsive to detecting lodging of the harvested plants.

13. The method of claim 1, wherein the control signal causes speed of a thresher of the harvester to adjust.

14. The method of claim 1, wherein the control signal is determined using the output of the first machine learning model in addition to inputs from at least one other camera of the harvester.

15. The method of claim 14, wherein the at least one other camera comprises at least one of a front camera of the harvester and a rear camera of the harvester.

16. The method of claim 1, further comprising uploading indicia of the control signals from the harvester to a cloud server.

17. The method of claim 16, further comprising adjusting the first machine learning model based on data downloaded from the cloud server.

* * * * *